No. 686,801. Patented Nov. 19, 1901.
A. F. BOX & J. B. B. GAGUE-LABEDAN.
ROTARY EXPLOSIVE ENGINE.
(Application filed Nov. 16, 1896.)

(No Model.) 6 Sheets—Sheet 1.

No. 686,801. Patented Nov. 19, 1901.
A. F. BOX & J. B. B. GAGUE-LABEDAN.
ROTARY EXPLOSIVE ENGINE.
(Application filed Nov. 16, 1896.)
(No Model.) 6 Sheets—Sheet 2.
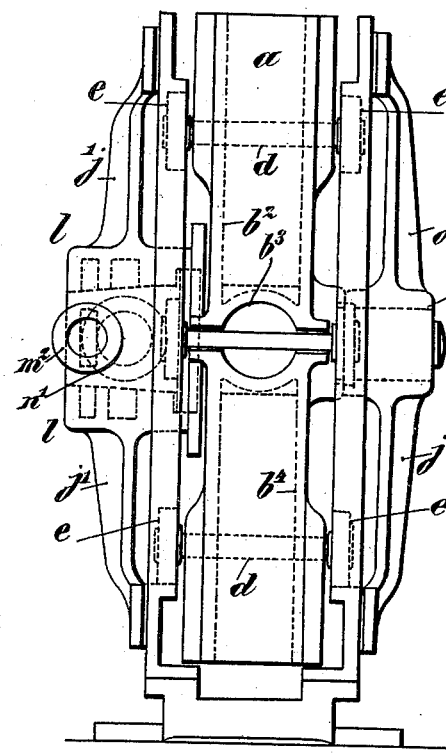

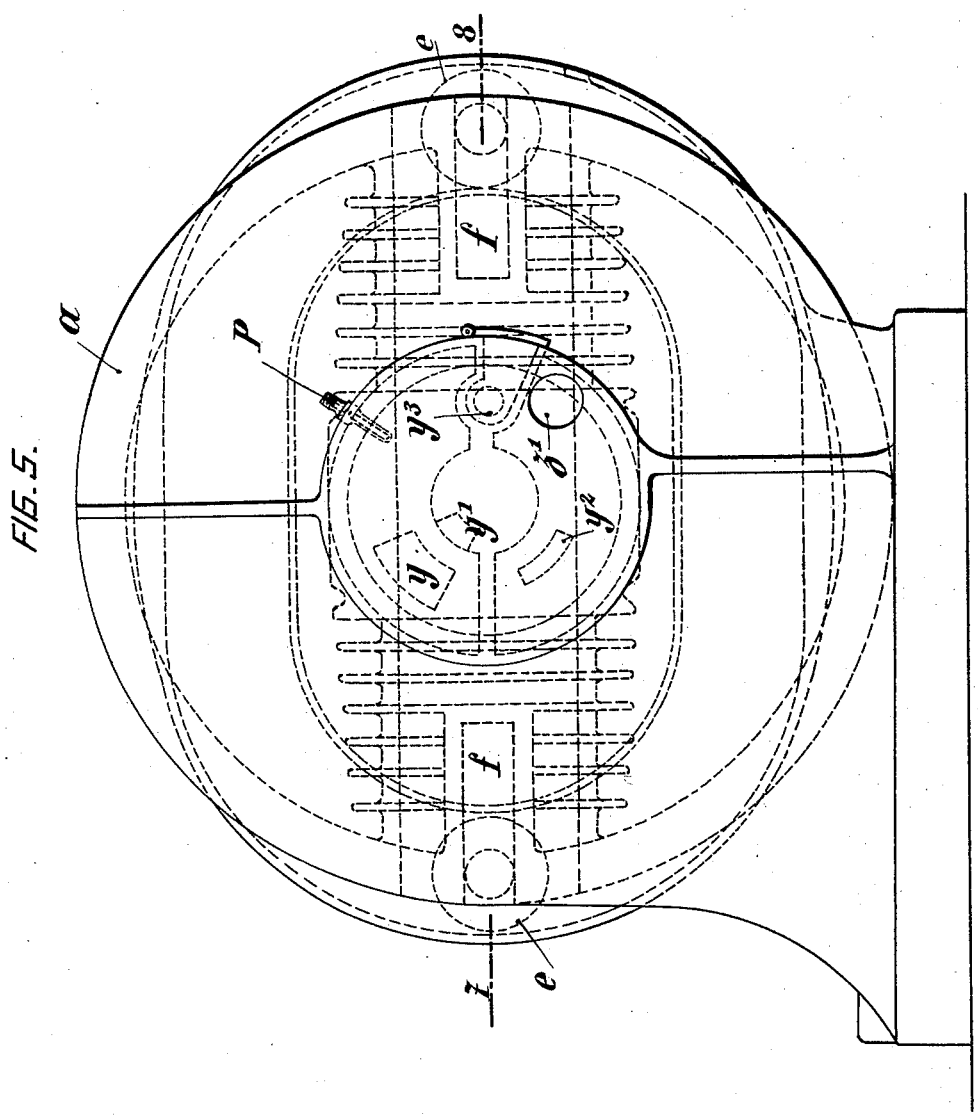

No. 686,801. Patented Nov. 19, 1901.
A. F. BOX & J. B. B. GAGUE-LABEDAN.
ROTARY EXPLOSIVE ENGINE.
(Application filed Nov. 16, 1898.)
(No Model.) 6 Sheets—Sheet 4.
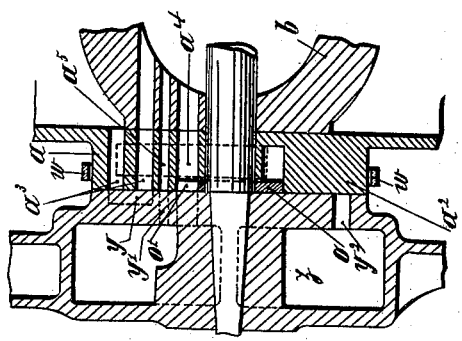
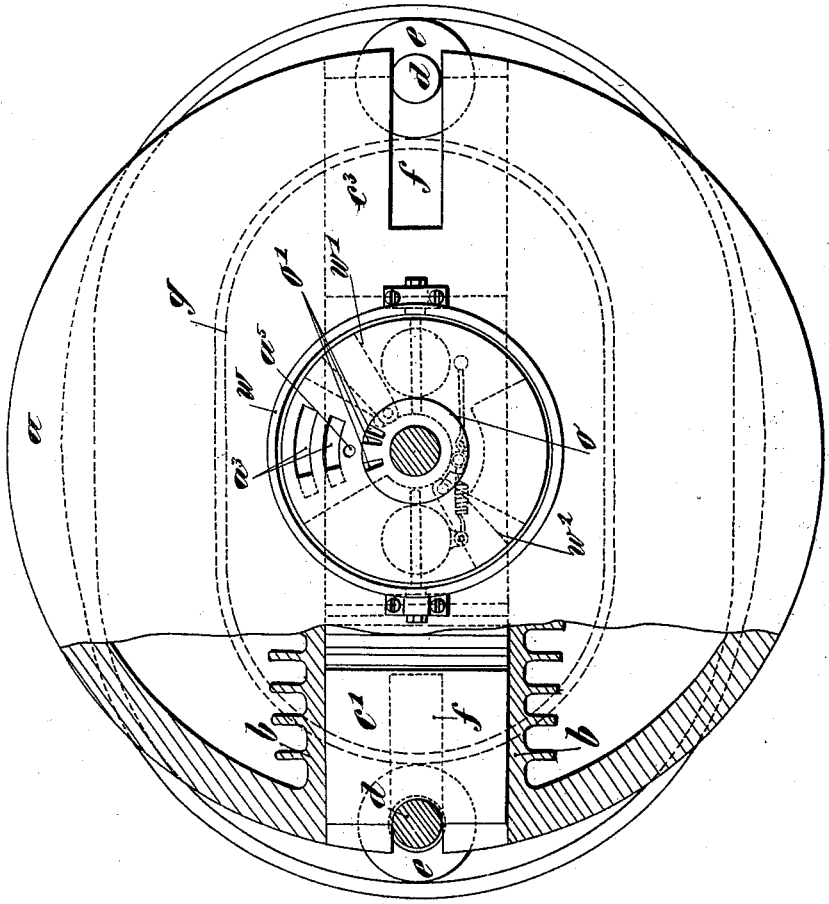
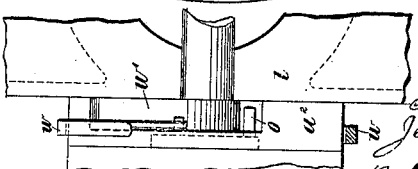

No. 686,801. Patented Nov. 19, 1901.
A. F. BOX & J. B. B. GAGUE-LABEDAN.
ROTARY EXPLOSIVE ENGINE.
(Application filed Nov. 16, 1898.)
(No Model.) 6 Sheets—Sheet 5.
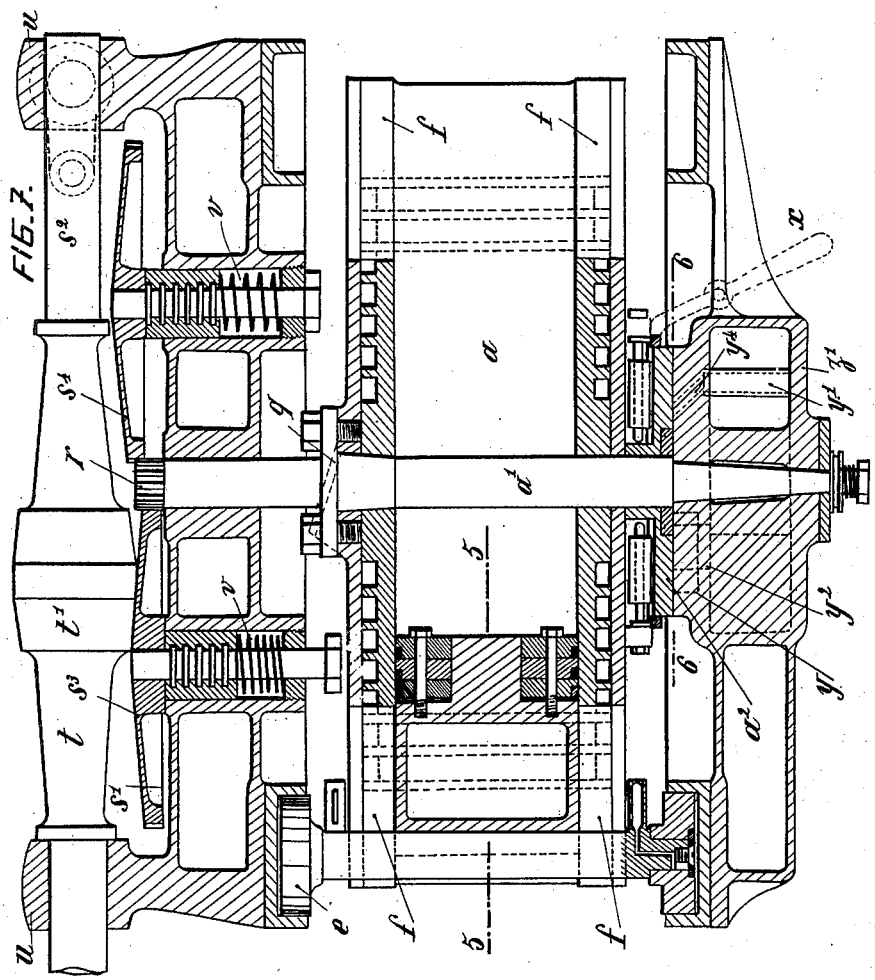

No. 686,801. Patented Nov. 19, 1901.
A. F. BOX & J. B. B. GAGUE-LABEDAN.
ROTARY EXPLOSIVE ENGINE.
(Application filed Nov. 16, 1896.)
(No Model.) 6 Sheets—Sheet 6.

UNITED STATES PATENT OFFICE.

AUGUSTE FRANÇOIS BOX AND JEAN BAPTISTE BARTHELEMY GAGUE-LABEDAN, OF PARIS, FRANCE.

ROTARY EXPLOSIVE-ENGINE.

SPECIFICATION forming part of Letters Patent No. 686,801, dated November 19, 1901.

Application filed November 16, 1896. Serial No. 612,278. (No model.)

*To all whom it may concern:*

Be it known that we, AUGUSTE FRANÇOIS BOX and JEAN BAPTISTE BARTHELEMY GAGUE-LABEDAN, of the city of Paris, France, have invented Improvements in Rotary Engines, (for which we have obtained Letters Patent in France for fifteen years, dated April 14, 1896, No. 255,517; in Belgium, for fifteen years, dated August 17, 1896, No. 123,063, and in England for fourteen years, dated August 20, 1896, No. 18,492,) of which the following is a full, clear, and exact description.

This invention relates to an improved rotary engine which may be operated by steam or compressed air or by the combustion of gas or oil; and the invention consists, essentially, in the combination and arrangement of the following essential parts of the engine, which comprises, first, a motor fly-wheel provided with two, three, or more radial cylinders, each containing a piston and having ports for the induction and eduction of the motive fluid, and, second, a peripheral roller-path of elliptical form acting as an abutment for the pistons, so that as each piston is forced outward by the fluid-pressure it exerts (after passing the dead-point at the minor axis of the ellipse) against the roller-path an effort in a direction oblique to the normal at the point of contact, so that the force is resolved into two components, the one normal to the roller-path and the other tangential thereto, the latter therefore producing angular motion of the piston and cylinder, and consequently of the fly-wheel.

The invention is illustrated by way of example in the accompanying drawings, forming part of this specification, in which—

Figure 1:
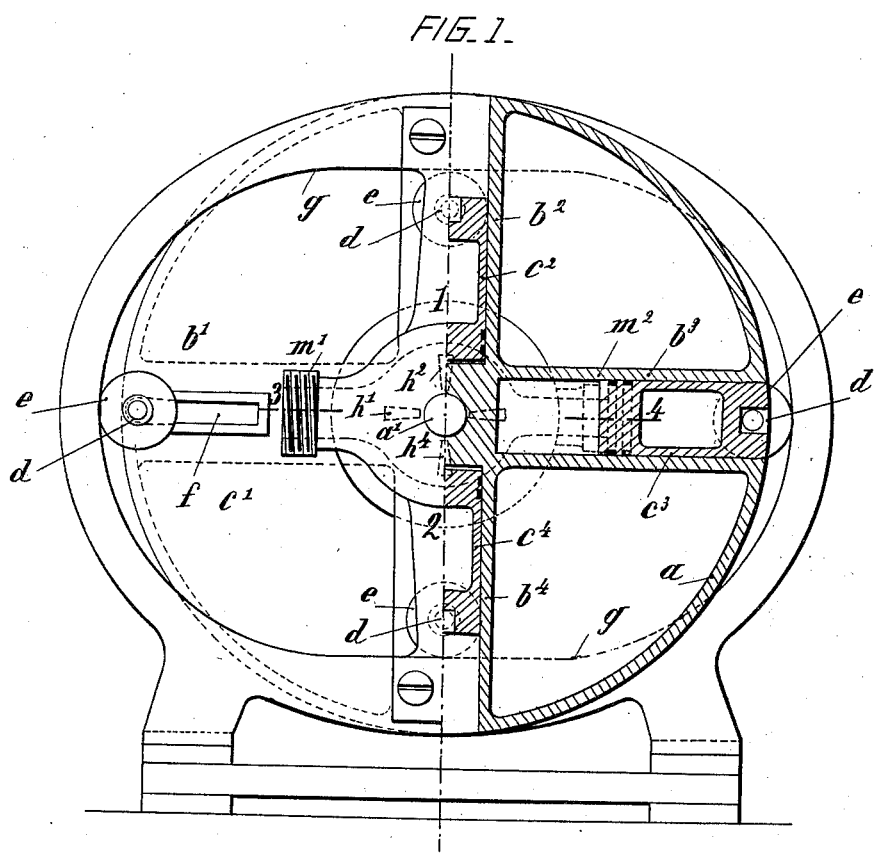
Figure 8:
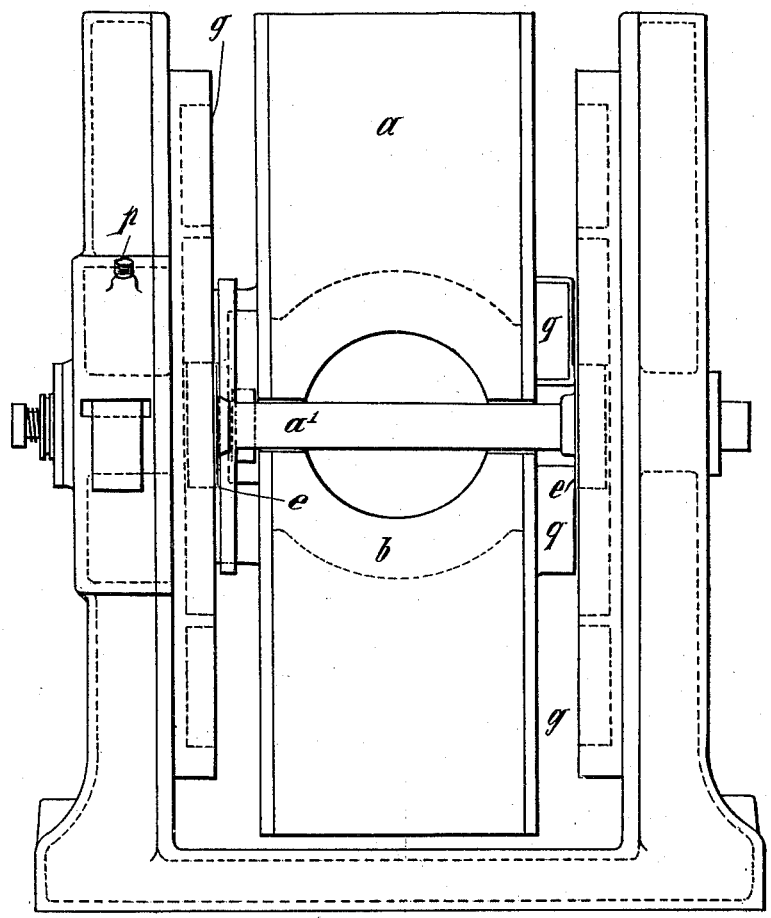

Figure 1 represents a half-elevation half-section, and Fig. 2 an end elevation, of the improved rotary engine. Figs. 3 and 4 are detail views of the distribution-valves, Fig. 3 being a section on line 1 2 of the admission-valve, and Fig. 4 a section on line 3 4 of the exhaust, these section-lines being indicated in Fig. 1. Fig. 5 is an elevation of a modification of the engine; Fig. 6, a longitudinal section on lines 5 5 and 6 6; Fig. 7, a horizontal section on line 7 8; Fig. 8, an end elevation; Fig. 9, a detail view in elevation, and Fig. $9^a$ in vertical section, of the distribution-valves.

The same letters of reference denote the same parts in all the figures.

The engine represented in Figs. 1 to 4 comprises, essentially, a fly-wheel $a$, keyed on a shaft $a'$, turning in bearings on the framework, one of said bearings being provided, as will be hereinafter described, with suitable passages and ports for the induction and eduction of the motive fluid. The fly-wheel $a$ is provided with four cylinders $b'\ b^2\ b^3\ b^4$, disposed radially and at right angles to each other, each fitted with a piston $c'\ c^2\ c^3\ c^4$; but it is to be understood that the number of cylinders may be varied according to circumstances. Each piston carries at its outer end a cross head or shaft $d$, which reciprocates in longitudinal guides $f$ and carries a pair of friction-rollers $e$, which abut each against a stationary circumjacent roller-path $g$, of elliptical form, respectively mounted upon the standards of the framing. The engine-shaft $a'$ revolves at the one end in an ordinary bearing $i$, carried by the cross-bar $j$, and at the other end in a stationary distribution-valve $k$ within a valve-box $l$, carried by the cross-bar $j'$. The valve $k$ has two sets of passages—the passages $k'\ k^3$ communicating with the exhaust-chamber $l'$ and the passages $k^2\ k^4$ with the admission-chamber $l^2$, the admission and exhaust pipes being connected to said chambers at $m^2\ m'$. In order to prevent leakage, the distribution-valve $k$ is held against its seat by fluid-pressure passing through the small channels $n$ from the admission-passages $k^2\ k^4$. The cylinders are respectively provided at their inner ends with ports $h'\ h^2\ h^3\ h^4$, each of which is by the revolution of the engine presented to the passages $k'\ k^2\ k^3\ k^4$ in succession, so as to place each cylinder $b'\ b^2\ b^3\ b^4$ alternately in communication with the admission and exhaust.

In the position shown in Figs. 1, 2, 3, and 4 the cylinders $b^2\ b^4$ are open to the admission and the cylinders $b'\ b^3$ to the exhaust, the pressure moving pistons $c^2\ c^4$ outward as soon as they have passed the dead-points at the minor axis of the elliptical roller-path.

As the pistons exert a thrust oblique to the normal to the roller-path at the point of contact therewith of the piston-rollers, the tangential component of the force imparts angular motion to the engine, the pistons $c'$ $c^3$ being at the same time caused to perform their return stroke in passing from the major toward the minor axis of the elliptical roller-path $g$. When the engine has made a quarter-revolution, the cylinders $b'$ $b^3$ open to the admission and cylinders $b^2$ $b^4$ to the exhaust, the same action being repeated, whereby continuous rotary motion is obtained. Any suitable governor and brake may be employed.

Figs. 5 to 9 illustrate a modification of the engine designed more particularly as a gas or oil engine. The motor fly-wheel $a$ has only two radial cylinders $b$, combined in one, placed diametrically, in which two pistons $c'$ $c^3$ work simultaneously in opposite directions, the pistons being provided, as before, with rollers $e$, which travel within a pair of roller-paths $g$ of elliptical form. The cylinder $b$ is brought by its rotation alternately into communication with the induction and exhaust through the medium of a valve-seat $a^2$, carried by the fly-wheel $a$ and having a double port $a^3$ for the admission of air, a port $a^4$ for the admission of petroleum-vapor, and an ignition-port $a^5$, each opening to the cylinder. The valve-seat $a^2$ moves over a stationary valve formed on the frame having a cavity $y$ for the passage of air, an admission-port $y'$ for petroleum-vapor, an exhaust-port $y^2$, and an ignition-port $y^3$, which communicates with passage $y^4$. The exhaust occurs when port $a^3$ comes opposite port $y^2$, the gases passing through chamber $z$ and escaping at $z'$. An automatic regulator for controlling the admission of the petroleum-vapor consists of a disk $o$, having ports $o'$ opposite the admission-port $a^4$, said disk revolving with the engine, but being capable of relative angular adjustment, so as to vary the effective sectional area of the admission-port, the adjustment of the disk being performed by any kind of governor—such, for example, as two weights movable along a guide-bar and tending to move apart in opposition to a spring under the action of centrifugal force—so that when the speed exceeds a certain limit the disk $o$ gradually closes the vapor-admission port until only a sufficient vapor is admitted to produce an explosion, and finally the admission-orifice is completely closed, the cylinder then only inhaling air until the speed again becomes normal, whereupon the disk returns to its initial position for the admission of petroleum-vapor. To regulate the admission of petroleum by hand, the collar $w$, loose about the valve $a^2$, has two arms $w'$ $w^2$, which terminate in pins engaging in slots in the regulating-disk $o$. In normal working the collar $w$ revolves with the engine, and the ports $o'$ of disk $o$ are opposite the admission-port $a^4$.

If, however, the collar $w$ be retarded by a lever $x$, acting thereon as a brake, the disk $o$ will be shifted relatively to the valve-port $a^4$, so as to reduce its area or even entirely close it. The two cheeks of the framing are made hollow to serve as reservoirs for the petroleum, which is injected by means of a pump or other suitable means through the nozzle $p$ into the admission-chamber within the framing. The air inhaled is drawn from the inclosed space within the fly-wheel $a$ around the cylinder, which is preferably gilled, whereby the surplus heat of the cylinder is imparted to the air before being inhaled, fresh air entering the fly-wheel through the apertures $q$. The motion may be transmitted by any suitable means; but it is preferred to employ the arrangement of reversing and speed gear represented in Fig. 7. A pinion $r$ on the shaft $a'$ gears with two coned friction-disks $s'$ $s^2$, revolving in opposite directions and with one or other of whose friction-surfaces $s^3$ $s^4$ a double friction-cone $t'$ on a shaft $t$ is brought into frictional contact, so that the shaft is driven in one or other direction, for which purpose shaft $t$ is adapted to slide longitudinally in its bearings $u$. Frictional driving contact between the disks and cone is insured by spiral springs $y$, and the speed of the shaft $t$ will vary according as the point of contact of the friction-cone is toward the periphery or center of the driving-disk.

In the type of engine illustrated in Figs. 5 to 9 the explosion is produced between the two pistons, which are forced in opposite directions, whereby higher speed is obtained, the engine working on the four-phase cycle. The position represented in the drawings corresponds to the end of the period of admission which has taken place during the preceding quarter-revolution. During the next quarter of a revolution the pistons are forced inward by the roller-path, this being the period of compression. At the end of this period the explosion takes place, followed by expansion during the next quarter of a revolution, while the exhaust takes place during the last quarter of a revolution. The explosive mixture is then again admitted, and the same operations are repeated at each revolution.

The engine may also be arranged to work on the compound principle.

We claim—

1. An explosive-engine comprising a hollow rotary wheel provided with an air-inlet, cylinders carried by said wheel interiorly so as to be inclosed in an air-chamber formed by the hollow wheel, a valve for establishing communication between said air-chamber and the cylinders, means for admitting fuel and for producing internal combustion, pistons in said cylinders, and means for rotating the wheel by the movement of the pistons.

2. An explosive-engine comprising a rotary wheel or casing provided with an air-let and forming an air-chamber, cylinders gilled externally and carried by the wheel within said air-chamber, a valve for establishing communication between said air-chamber and the cylinders, means for admitting fuel and for producing internal combustion, pistons in said cylinders, and means for rotating the wheel by the movement of the pistons.

The foregoing specification of our improvements in rotary engines signed by us this 4th day of November, 1896.

AUGUSTE FRANÇOIS BOX.
JEAN BAPTISTE BARTHELEMY GAGUE-LABEDAN.

Witnesses:
H. T. SMITH,
ALBERT MOREAU.